US010315755B2

(12) United States Patent
Himmelmann

(10) Patent No.: US 10,315,755 B2
(45) Date of Patent: Jun. 11, 2019

(54) AERODYNAMIC NOISE REDUCING THIN-SKIN LANDING GEAR STRUCTURE

(71) Applicant: Goodrich Corporation, Charlotte, NC (US)

(72) Inventor: Richard A. Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 677 days.

(21) Appl. No.: 15/184,517

(22) Filed: Jun. 16, 2016

(65) Prior Publication Data

US 2017/0361924 A1    Dec. 21, 2017

(51) Int. Cl.
| B64C 25/10 | (2006.01) |
| B64C 25/02 | (2006.01) |
| B64C 25/60 | (2006.01) |
| B64C 25/34 | (2006.01) |
| B64C 25/00 | (2006.01) |

(52) U.S. Cl.
CPC .............. B64C 25/10 (2013.01); B64C 25/02 (2013.01); B64C 25/34 (2013.01); B64C 25/60 (2013.01); *B64C 2025/003* (2013.01)

(58) Field of Classification Search
CPC ......... B64C 25/60; B64C 25/02; B64C 25/34; B64C 25/10; B64C 25/14; B64C 25/50; B64C 2025/003; B64C 37/00; B64C 7/00; B64D 27/26; B64D 2027/264
USPC .................................................. 284/554–557
See application file for complete search history.

(56) References Cited

U.S. PATENT DOCUMENTS

| 2,395,690 | A | | 2/1946 | Sherman |
| 5,743,491 | A | * | 4/1998 | Meneghetti ............. B64C 25/34 244/102 A |
| 6,349,901 | B1 | | 2/2002 | Grossman |
| 8,490,914 | B2 | | 7/2013 | Chow et al. |
| 2009/0078821 | A1 | * | 3/2009 | Chow ....................... B64C 7/00 244/1 N |
| 2014/0131514 | A1 | | 5/2014 | Cook |
| 2017/0113811 | A1 | * | 4/2017 | Cokonaj ................ B64C 25/10 |

FOREIGN PATENT DOCUMENTS

| FR | 1033176 | A | | 7/1953 |
| GB | 565052 | A | | 10/1944 |
| GB | 1040424 | A | * | 8/1966 ............ B64C 25/60 |
| GB | 1040424 | A | | 8/1966 |

OTHER PUBLICATIONS

Extended European Search Report dated Nov. 20, 2017 in Application No. 17176442.6.

* cited by examiner

*Primary Examiner* — Richard R. Green
*Assistant Examiner* — Vincente Rodriguez
(74) *Attorney, Agent, or Firm* — Snell & Wilmer, L.L.P.

(57) ABSTRACT

A landing gear assembly is also provided. The landing gear assembly may include a thin-skin support member defining a cavity and a cylindrical cavity. A cylinder may extend from the cylindrical cavity with an axle extending from the cylinder. A torsion link may be coupled to the axle and a torsion interface of the thin-skin support member.

18 Claims, 8 Drawing Sheets

AERODYNAMIC NOISE REDUCING THIN-SKIN LANDING GEAR STRUCTURE

FIELD

The disclosure relates generally to aircraft landing gear, with various embodiments relating to thin-skinned landing gear structures.

BACKGROUND

Aircraft designers have continuously tried to increase the fuel efficiency of aircraft over the last century. The fuel efficiency of an aircraft may be related to the aircraft's mass and aerodynamic drag. In addition, noise regulations for aircraft at low altitudes encourage reduction of the aircraft's noise signature while it is near the ground. Landing gear can be heavy and aerodynamically resistant. Additionally, deployed landing gear may increase the noise signature of an aircraft as a result of air rushing past the deployed gear.

SUMMARY

A thin-skin support member is provided. The thin-skin support member may comprise a semi-circular edge and an elongated surface that define a cavity. A cylindrical cavity may be disposed adjacent the cavity and at least partially defined by the semi-circular edge. The cylindrical cavity nay also be configured to retain a strut assembly. A mounting interface may be coupled to the semi-circular edge and the elongated surface. A torsion interface may be disposed adjacent the cylindrical cavity and configured to receive a torsion link.

In various embodiments, the cavity may be configured to retain at least one of an electronic component or a hydraulic component. The thin-skin support member may include at least one of aluminum, titanium, steel, fiber and resin composites, woods, or other suitable materials. The thin-skin support member may also be machined from a block of metal. A mid-body support may have the cylindrical cavity extending from the mid-body support. The mounting interface and/or the mid-body support may be forged. The semi-circular edge and the elongated surface may be at least partially defined by a segment of sheet metal welded to the mid-body support.

A landing gear assembly is also provided. The landing gear assembly may include a thin-skin support member defining a cavity and a cylindrical cavity. A cylinder may extend from the cylindrical cavity with an axle extending from the cylinder. A torsion link may be coupled to the axle and a torsion interface of the thin-skin support member.

In various embodiments, the cylindrical cavity may be configured to retain a strut assembly. The thin-skin support member may include a mounting location configured for pivotal coupling to a support arm. The cavity may be configured to retain at least one of an electronic component or a hydraulic component. The thin-skin support member may include at least one of aluminum, steel, or titanium. The thin-skin support member may be machined from a block of metal. The cylindrical cavity may extend from a mid-body support. The thin-skin support member may also include a mounting interface configured for coupling to an aircraft. At least one of the mounting interface and the mid-body support may be forged. A semi-circular edge of the thin-skin support member and an elongated surface of the thin-skin support member may be at least partially defined by a segment of sheet metal welded to the mid-body support. The landing gear assembly may also include a primary support arm pivotally coupled to the thin-skin support member, a linkage pivotally coupled to the primary support arm, and a secondary support arm coupled to the thin-skin support member and at least one of the primary support arm or the linkage. An interface structure may be coupled to the linkage with the landing gear assembly being configured to deploy and/or retract in response to a translation of the interface structure.

A method of making a thin-skin support member is also provided. The method includes the steps of forging a mounting interface, forging a mid-body support having a cylinder extending from the mid-body support, and welding sheet metal to the mid-body support and the mounting interface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to landing gear assemblies having aerodynamic thin-skin support members, in accordance with various embodiments. Landing gear assemblies may have reduced weight and improved stress distribution by using a hollow-bodied, thin-skin support member to provide the primary vertical support. This thin-skin design uses thin skin construction, similar to wing design, to distribute the forces along a greater surface area and thereby enable a reduced cross-section area, which reduces the overall mass of the landing gear. This concept also produces a smooth, aerodynamic structure, which reduces drag and noise production due to aerodynamic buffering. Hydraulic lines and landing gear wiring harnesses can be routed through the empty space within the landing gear structure. Internal routing may protect the equipment from environmental damage, while also reducing the aircraft's aerodynamic drag and noise production.

Figure 1:
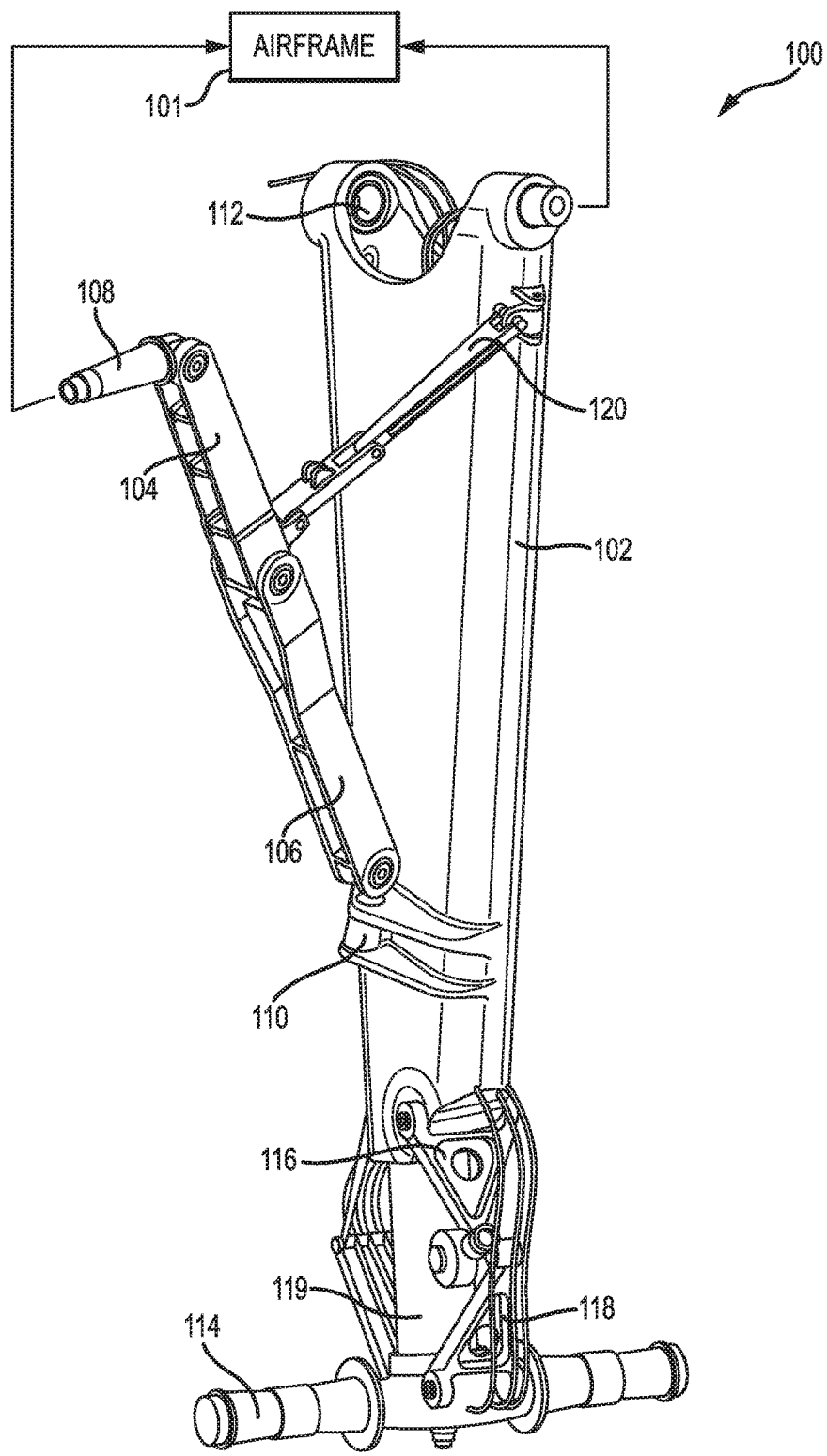
FIG. 1 illustrates a thin-skin landing gear assembly, in accordance with various embodiments.
Figure 2:
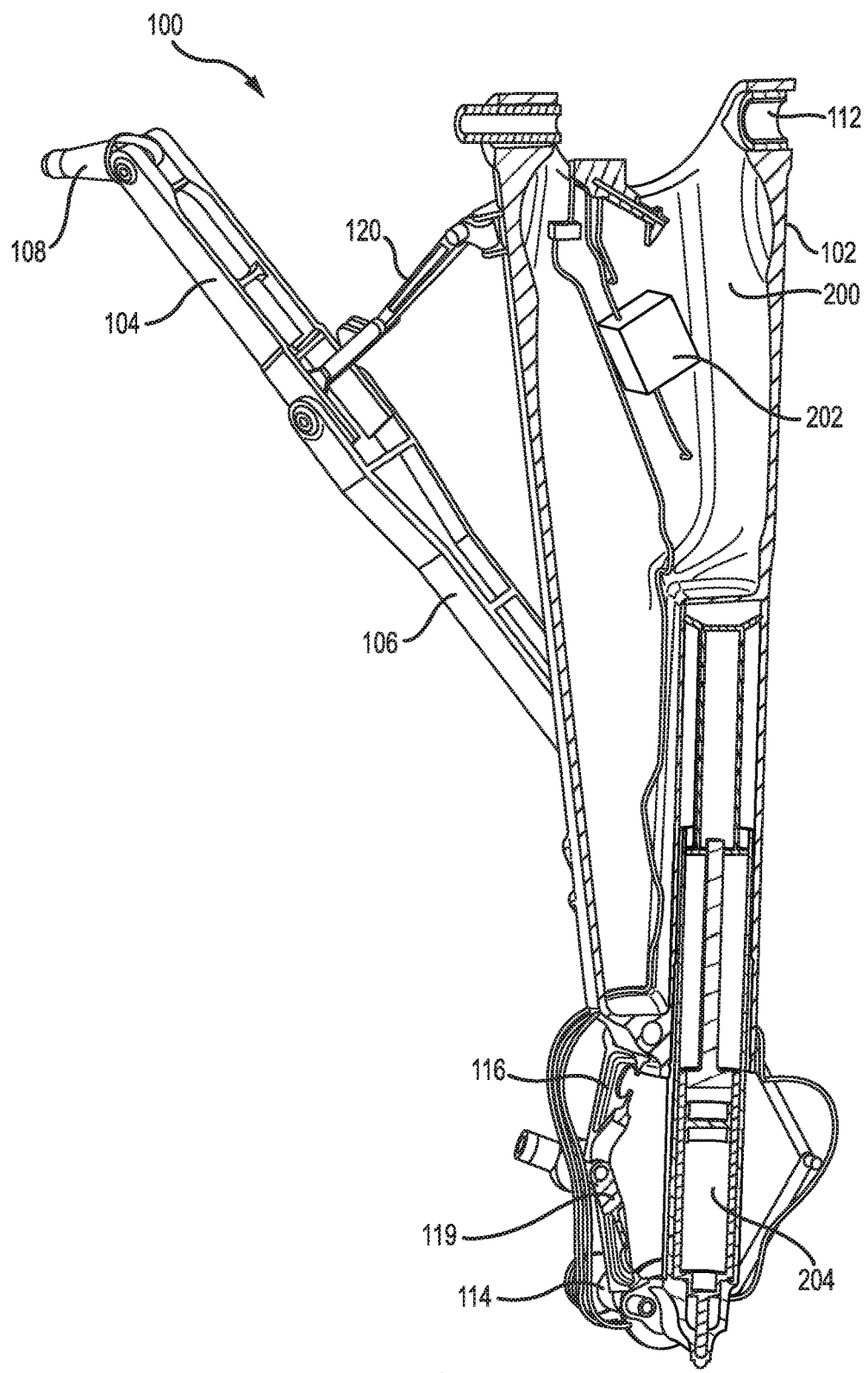
FIG. 2 illustrates a sectional view of a thin-skin landing gear assembly having an internal cavity, in accordance with various embodiments.

With reference to FIGS. 1 and 2, landing gear assembly 100 is shown, in accordance with various embodiments. Landing gear assembly 100 may include thin-skin support member 102 to provide light-weight support for landing gear assembly 100. Thin-skin support member 102 may be pivotally coupled to support gear 106 at mounting location 110 of thin-skin support member 102. Support arm 106 may further be pivotally coupled to linkage 104, which is pivotally coupled to interface structure 108. A secondary support arm 120 may be mechanically coupled to support arm 106 and thin-skin support member 102. Thin-skin support member 102, support arm 106, and secondary support arm 120 may form a triangular support structure.

In various embodiments, landing gear assembly 100 may be pivotally coupled to an airframe 101 at mounting interface 112. Landing gear assembly may also be coupled to airframe 101 at interface structure 108. Landing gear assembly may deploy and stow by pivoting about mounting interface 112 in response to translation of interface structure 108. Thin-skin support member 102 may at least partially contain cylinder 119 extending from thin-skin support member 102. Cylinder 119 may be a cylindrical member that is substantially perpendicular to axle 114. A wheel assembly may be coupled to axle 114 and configured to roll while supporting the weight of the aircraft.

In various embodiments, upper torsion link 116 may be pivotally coupled to thin-skin support member 102 at two vertices of upper torsion link 116. Upper torsion link 116 may resemble an isosceles triangle or an equilateral triangle, with one vertex of upper torsion link 116 pivotally coupled to one vertex of lower torsion link 118. Lower torsion link 118 may also resemble an isosceles triangle or an equilateral triangle, with two vertices of lower torsion link 118 mechanically coupled to axle 114. Upper torsion link 116 and lower torsion link 118 may be configured to pivot in response to translation of cylinder 119 into and/or out from a cylindrical cavity of thin-skin support member 102, as shown in greater detail below.

Referring now to FIG. 2, a partial cross-section of landing gear assembly 100 through thin-skin support member 102 is shown, in accordance with various embodiments. Thin-skin support member 102 defines cavity 200. Cavity 200 may contain internal hydraulic and/or electronic components 202. Cavity 200 may also remain hollow and retain air. Strut assembly 204 may be retained in place by internal walls of thin-skin support member 102, as described in greater detail below. The upper torsion link 116 and lower torsion link 118 may be configured to restrict the twisting of strut assembly 204 (and cylinder 119 and axle 114 of FIG. 1) with respect to thin-skin support member 102.

Figure 3A:
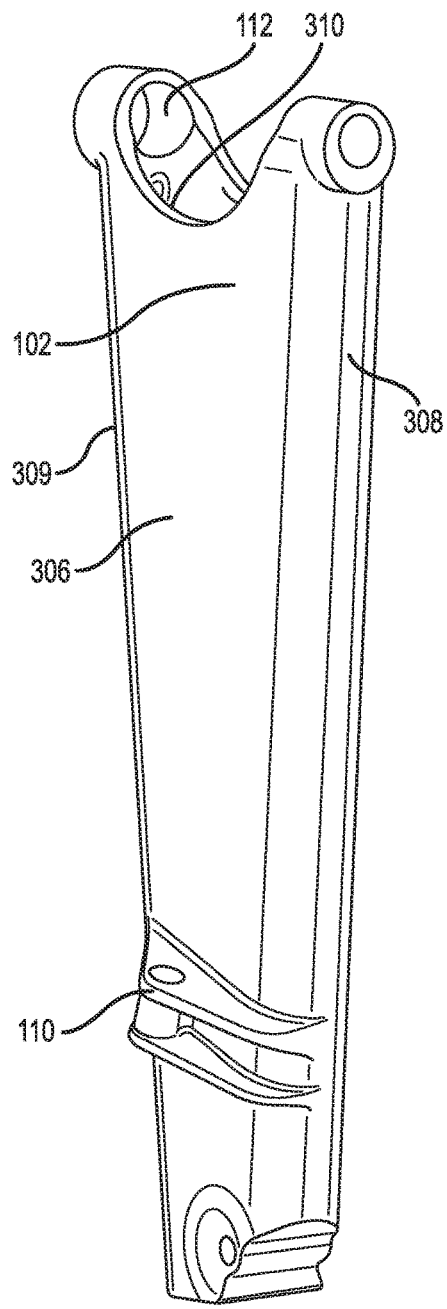
FIG. 3A illustrates a perspective view a thin-skin vertical support member, in accordance with various embodiments.
Figure 3B:
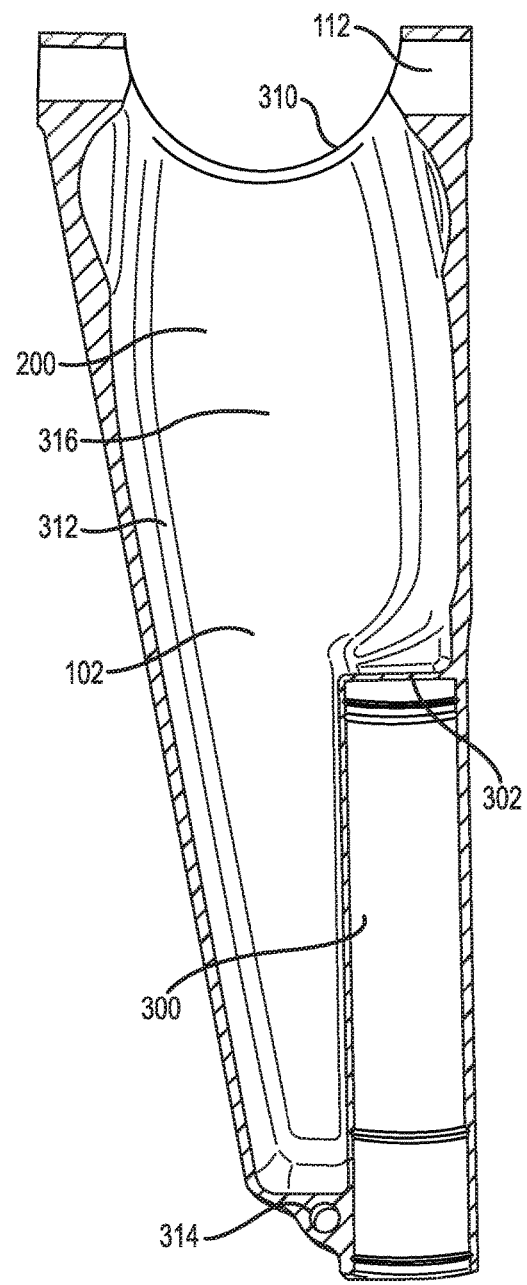
FIG. 3B illustrates a sectional view of a thin-skin support member having an internal cavity, in accordance with various embodiments.

With reference to FIGS. 3A and 3B, thin-skin support member 102 is shown, in accordance with various embodiments. Thin-skin support member 102 may include a semicircular edge 308 adjacent to an elongated surface 306 extending to semicircular edge 309. Elongated surface 306 may be a large-radius rounded surface appearing flattened relative to semi-circular edge 309. Elongated surface 306 may also be a straight face, or a combination of radial surfaces and flat surfaces. Semi-circular edge 308 and semicircular edge 309 may be oriented on the forward and/or aft end of thin-skin support member 102 such that air passing by thin-skin support member 102 moves from a semicircular edge, across the elongated surface, to another semicircular edge. Thin-skin support member 102 may thus define cylindrical cavity 300 internal to thin-skin support member 102 and adjacent to cavity 200. Cylindrical cavity 300 may be configured to retain strut assembly 204 of FIG. 2 and/or engage cylinder 119 of FIG. 2. Thus, cylindrical cavity 300 may terminate at circular internal wall 302. Cylindrical cavity 300 may be partially defined by the internal surface of semi-circular edge 308.

In various embodiments, cavity 200 may be at least partially defined by internal surface 316 of elongated surface 306 and internal surface 312 of semi-circular edge 308. Thin-skin support member 102 may also include mounting interface 112 for coupling to an aircraft. Torsion interface 314 may be disposed adjacent cylindrical cavity 300 and configured to receive upper torsion link 116 of FIG. 1. Thin-skin support member 102 may also include a cutaway section 310 having a circular and/or semicircular geometry to reduce weight of thin-skin support member 102.

Figure 4A:
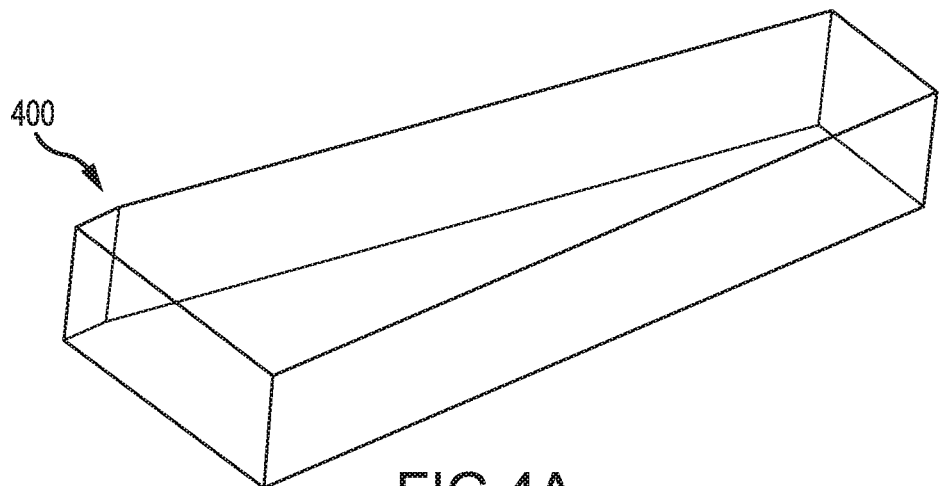
FIGS. 4A, 4B and 4C illustrate a process of machining a thin-skin support member from a metal block, in accordance with various embodiments.
Figure 4B:
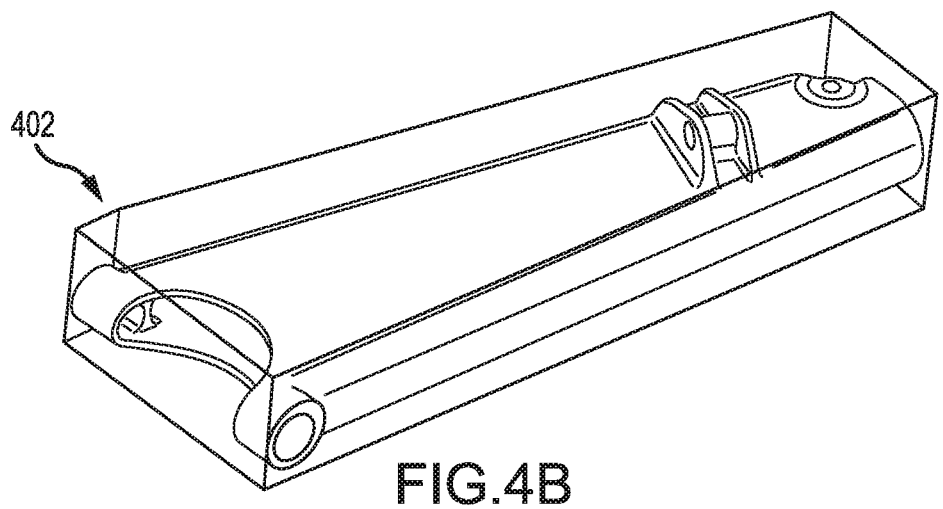
Figure 4C:
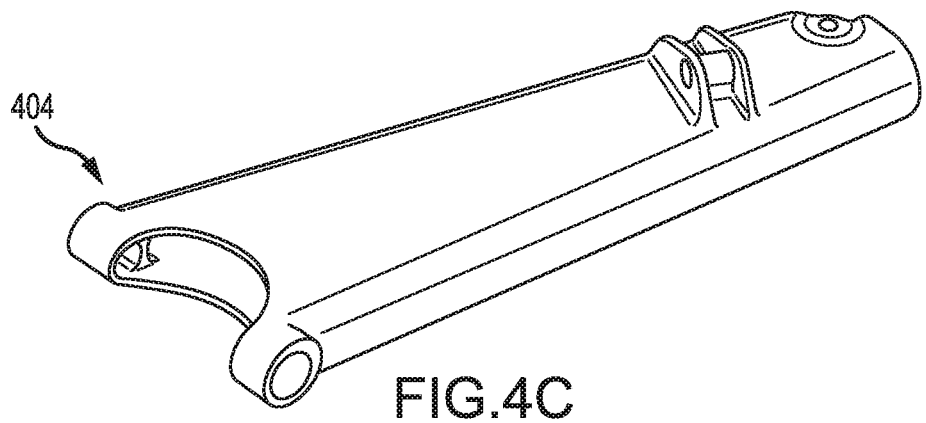

Referring now to FIGS. 4A, 4B, and 4C, an exemplary process for making thin-skin support member 102 by machining is shown, in accordance with various embodiments. Block 400 of metal may be prepared for machining, as shown in FIG. 4A. The metal block may include aluminum, titanium, steel, or any other metal or metal alloy desired for thin-skin support member 102 of FIG. 1. The use of aluminum for thin-skin support member 102 may reduce weight of landing gear assembly 100 in FIG. 1 by approximately 19% over conventional designs. The use of titanium for thin-skin support member may reduce the weight of landing gear assembly 100 in FIG. 1 by approximately 53% over conventional designs.

In various embodiments, and with reference to FIGS. 4A and 4B, portions of block 400 may be machined away to leave intermediate support member 402. Intermediate 402 may be machined until support member 404 of FIG. 4C remains. In various embodiments, support member 404 remaining after machining may comprise approximately 12%, 10%-15%, or 8%-20% of the mass initially present in block 400 of metal.

Figure 5:
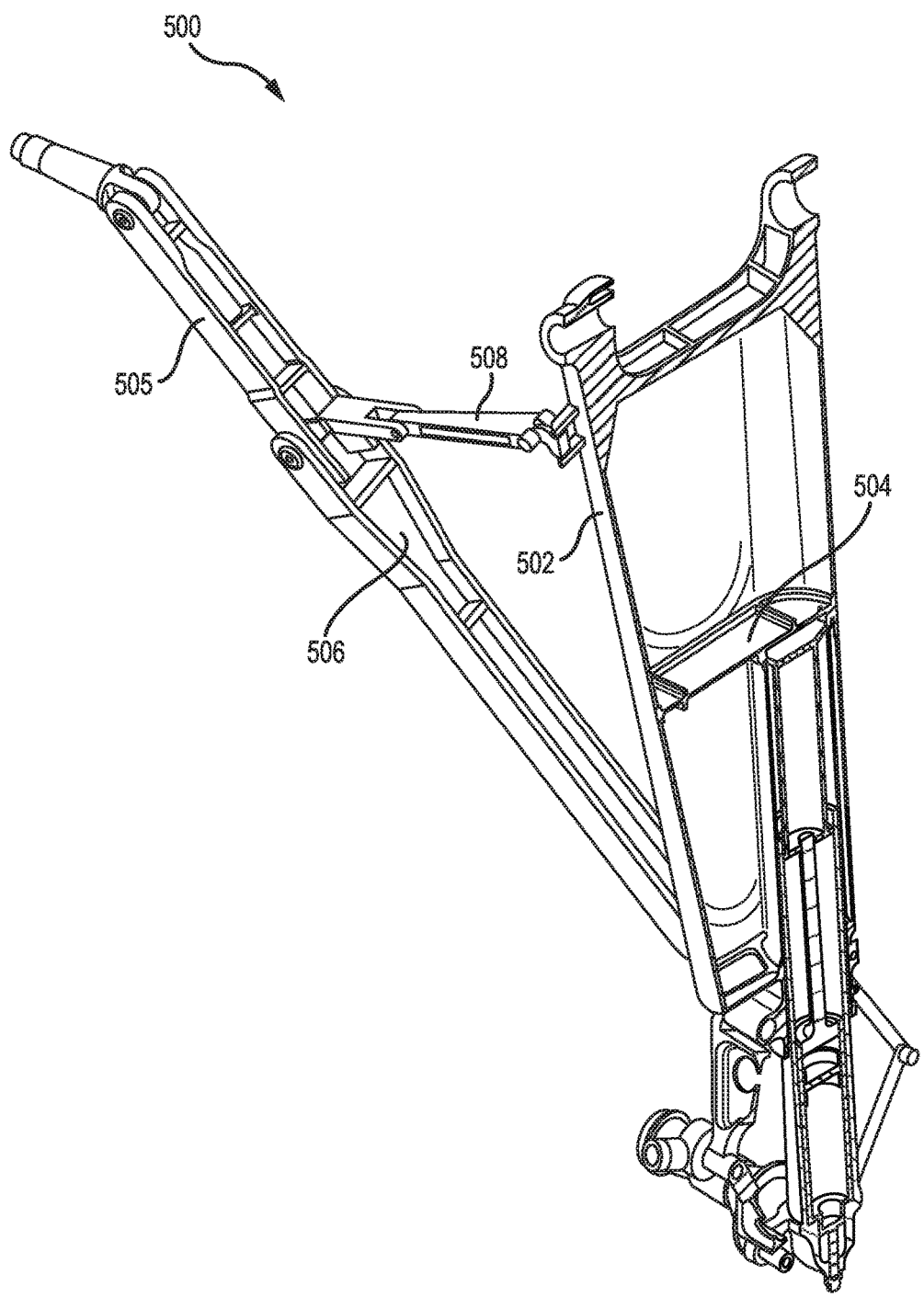
FIG. 5 illustrates a partial sectional view of a thin-skin landing gear assembly having a mid-body support member, in accordance with various embodiments.

Referring now to FIG. 5, an exemplary landing gear assembly 500 is shown, in accordance with various embodiments. Landing gear assembly 500 may be similar to thin-skin support member 102 of FIG. 1. Landing gear assembly 500 may include thin-skin support member 502 having mid-body support 504 disposed inside of thin-skin support member 502. Thin-skin support member 502 may be pivotally coupled to support arm 506, which is pivotally coupled to linkage 505. Secondary support arm 508 may also be coupled to linkage 505. Landing gear assembly 500 may thus deploy and retract in a manner similar to that of landing gear assembly 100 of FIG. 1.

Figure 6A:
FIG. 6A illustrates perspective view of a thin-skin support member having mid-body support member, in accordance with various embodiments.
Figure 6B:
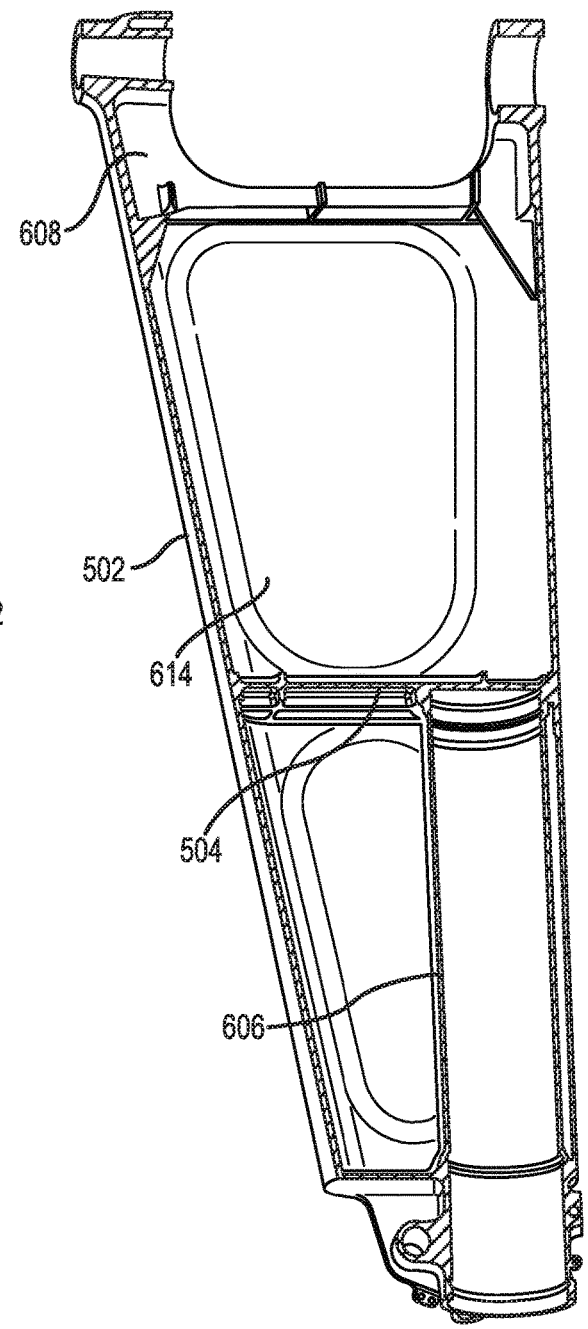
FIG. 6B illustrates cross-sectional view of a thin-skin support member having mid-body support member, in accordance with various embodiments.

Referring now to FIGS. 6A and 6B, thin-skin support member 502 is shown, in accordance with various embodiments. Thin-skin support member 502 may include semi-circular edge 610 adjacent elongated surface 612. An internal surface 614 of elongated surface 612 may define an internal cavity of thin-skin support member 502. An interface portion 608 of thin-skin support member 502 may be configured for coupling to an aircraft. Interface portion 608 may include a cutaway to reduce the weight of thin-skin support member 502.

In various embodiments, thin-skin support member 502 may include mid-body support 504 extending completely across internal surface 614. Mid-body support 504 may define a terminus of cylinder 606. Cylinder 606 may extend from mid-body support 504 and be configured to retain a strut assembly similar to strut assembly 204 of FIG. 2. An interface configured for joining to a torsion link may be included proximate an opening end of cylinder 606.

Figure 7:
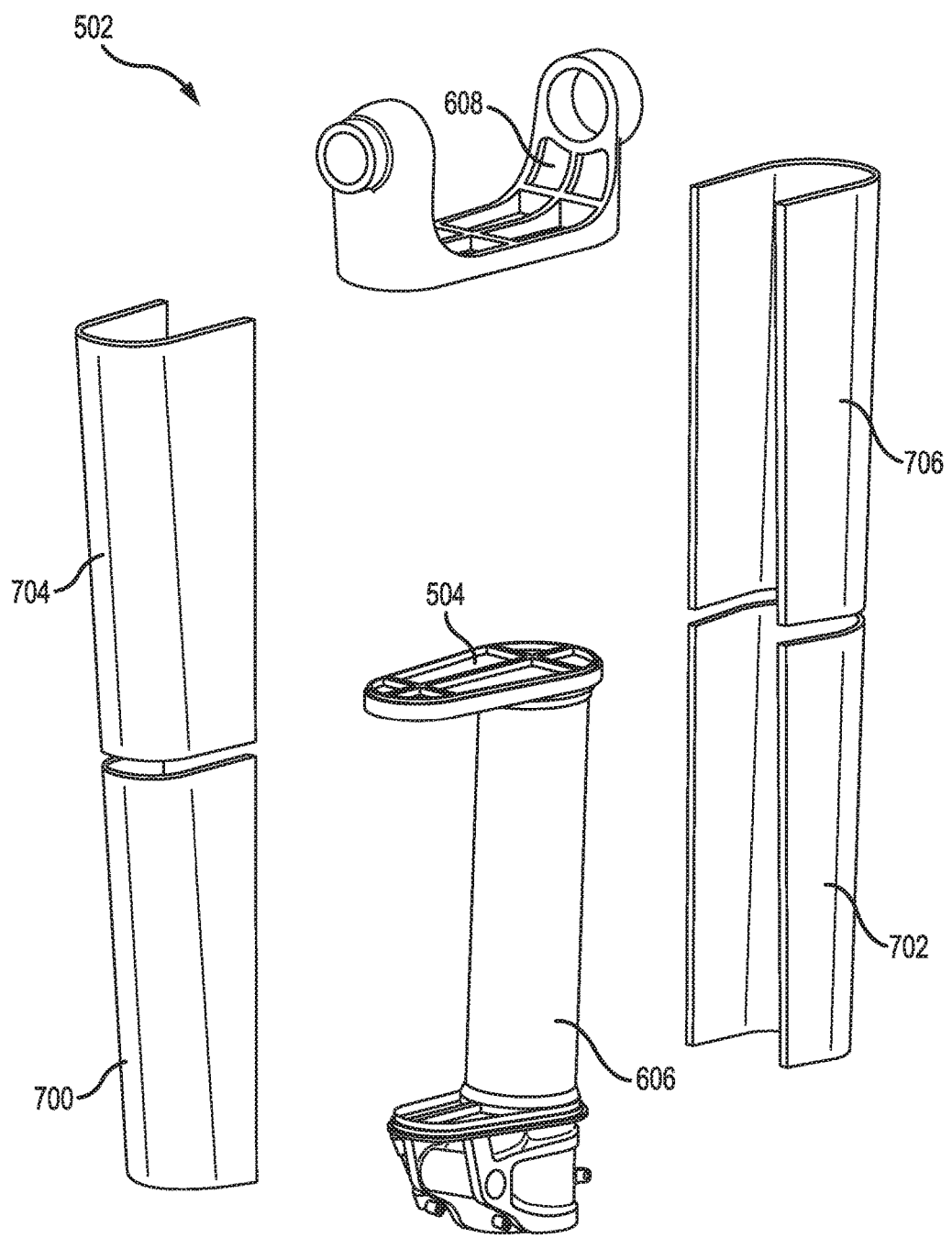
FIG. 7 illustrates an exploded view of metal components configured for welding to form a thin-skin support member, in accordance with various embodiments.
Figure 8:
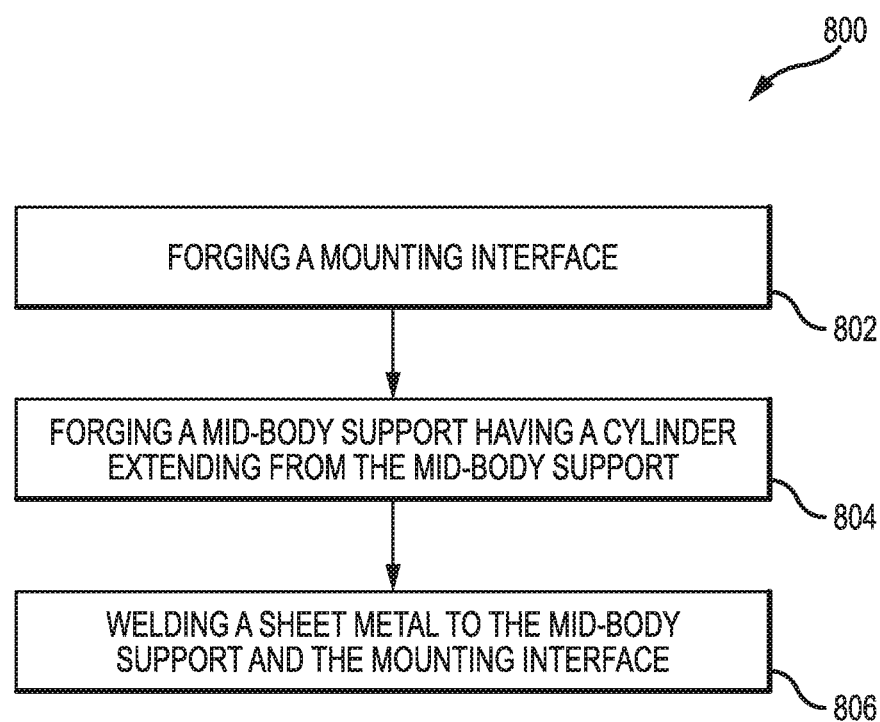
FIG. 8 illustrates an exemplary process for forming a thin-skinned support member by welding, in accordance with various embodiments.

In various embodiments, and with reference to FIG. 7, exemplary components of thin-skin support member 502 are shown, in accordance with various embodiments. Thin-skin support member 502 may be assembled by welding or otherwise joining the components illustrated in FIG. 7. Interface portion 608 and mid-body support 504 may be forged components. Method 800 may thus include the steps of forging a mounting interface such as interface portion 608 (Step 802), and forging a mid-body support 504 with a cylinder 606 extending from the mid body support and the mounting interface (Step 804).

In various embodiments, the method also includes welding sheet metal to the mid-body support and mounting interface (Step 806). Interface portion 608 and mid-body support 504 may be joined by welding to sheet metal elements. Lower curved segment 700 and lower curved segment 702 may be welded or joined to each other as well as to mid-body support 504 and/or cylinder 606. Lower curved segment 700 may also be welded or joined to upper curved segment 704. Lower curved segment 702 may further be welded or joined to upper curved segment 706. Upper curved segment 704 and upper curved segment 706 may be welded or joined to interface portion 608. In various embodiments, the lower curved segments and upper curved segments may be formed from sheet metal and joined to the forged components (interface portion 608 and mid-body support 504) at relatively low stress locations.

Thin-skinned support members of the present disclosure may tend to reduce weight and increase stiffness, as the curved surfaces and elongated geometry of thin-skinned members use less material to achieve acceptable support levels. The thin-skin support member may also tend to reduce turbulence of air passing by the deployed landing gear with its smooth surfaces and rounded contours. In that regard, thin-skin support members of the present disclosure may thus tend to minimize noise generated by air rushing past deployed landing gear assemblies.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein; references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thin-skin support member, comprising:
   a semi-circular edge and an elongated surface that define a cavity;
   a cylindrical cavity adjacent the cavity and at least partially defined by the semi-circular edge, wherein the cylindrical cavity is configured to retain a strut assembly of an aircraft landing gear;

a mounting interface coupled to the semi-circular edge and the elongated surface;

a semicircular cutaway section adjacent to an upper portion of the elongated surface and configured to reduce weight of the thin-skin support member, wherein the semicircular cutaway section is adjacent to and exposes the cavity and the mounting interface; and a torsion interface disposed adjacent the cylindrical cavity and configured to receive a torsion link.

2. The thin-skin support member of claim 1, wherein the cavity is configured to retain at least one of an electronic component or a hydraulic component.

3. The thin-skin support member of claim 1, further comprising at least one of aluminum, titanium, or steel.

4. The thin-skin support member of claim 1, wherein the thin-skin support member is machined from a block of at least one of a metal or metal alloy.

5. The thin-skin support member of claim 1, further comprising a mid-body support, wherein the cylindrical cavity extends from the mid-body support.

6. The thin-skin support member of claim 5, wherein at least one of the mounting interface and the mid-body support are forged.

7. The thin-skin support member of claim 6, wherein the semi-circular edge and the elongated surface are at least partially defined by a segment of sheet metal welded to the mid-body support.

8. A landing gear assembly, comprising:

a thin-skin support member defining a cavity and a cylindrical cavity, the thin-skin support member comprising a semicircular cutaway section adjacent to an upper portion of an elongated surface, the semicircular cutaway section configured to reduce a weight of the thin-skin support member, wherein the semicircular cutaway section is adjacent to and exposes the cavity and a mounting interface of the landing gear assembly;

a cylinder extending from the cylindrical cavity;

an axle extending from the cylinder; and a torsion link coupled to the axle and a torsion interface of the thin-skin support member.

9. The landing gear assembly of claim 8, wherein the cylindrical cavity is configured to retain a strut assembly.

10. The landing gear assembly of claim 9, wherein the thin-skin support member comprises a mounting location configured for pivotal coupling to a support arm.

11. The landing gear assembly of claim 10, wherein the cavity is configured to retain at least one of an electronic component or a hydraulic component.

12. The landing gear assembly of claim 10, wherein the thin-skin support member comprises at least one of aluminum, titanium, or steel.

13. The landing gear assembly of claim 10, wherein the thin-skin support member is machined from a block of metal.

14. The landing gear assembly of claim 10, further comprising a mid-body support, wherein the cylindrical cavity extends from the mid-body support.

15. The landing gear assembly of claim 14, wherein at least one of the mounting interface and the mid-body support are forged.

16. The landing gear assembly of claim 15, wherein a semi-circular edge of the thin-skin support member and the elongated surface of the thin-skin support member are at least partially defined by a segment of sheet metal welded to the mid-body support.

17. The landing gear assembly of claim 10, further comprising:

a primary support arm pivotally coupled to the thin-skin support member;

a linkage pivotally coupled to the primary support arm; and a secondary support arm coupled to the thin-skin support member and at least one of the primary support arm or the linkage.

18. The landing gear assembly of claim 17, further comprising an interface structure coupled to the linkage, wherein the landing gear assembly is configured to at least one of deploy or retract in response to a translation of the interface structure.

* * * * *